United States Patent Office 2,759,024
Patented Aug. 14, 1956

2,759,024

HEXITOLS BY HYDROGENATION OF SUCROSE

Leo Kasehagen, West Chester, Pa., and Michael Morris Luskin, Collins Park, Del., assignors to Atlas Powder Company, Wilmington, Del., a corporation of Delaware No Drawing. Application July 16, 1952,
Serial No. 299,282

6 Claims. (Cl. 260—635)

This invention relates to the continuous hydrogenation of sugars, and more particularly to a process for the production, by continuous hydrogenation, of a mixture of mannitol and sorbitol, essentially free from related polyhydric materials, utilizing sucrose as a raw material.

An object of the invention is to provide a method for producing mannitol and sorbitol from sucrose.

Another object is to provide a method for producing from sucrose, by hydrolysis and continuous catalytic hydrogenation, a mixture of sorbitol and mannitol containing very low percentages of reducing and non-reducing sugars.

The above and other objects will become more apparent in the course of the following description of the invention and in the claims.

The prior art has established that when glucose is catalytically hydrogenated in essentially neutral solution and under mild conditions of temperature and pressure, the product of the reduction is sorbitol of high purity; and that when fructose is hydrogenated under similar conditions, the product of the reduction is a mixture of sorbitol and mannitol in essentially equal proportions, and free from related polyhydroxylic materials. The prior art has likewise established that as the conditions of hydrogenation depart from neutrality, either on the alkaline or acid side; and as the temperature and/or pressure become excessively high, reactions other than hydrogenation occur simultaneously therewith and complex mixtures are obtained which contain reduction products and/or hydrogenolysis products of sugar isomers as well as the expected sorbitol and mannitol.

It is taught in the prior art that sucrose may be hydrolyzed to the mixture of glucose and fructose known as invert sugar and catalytically hydrogenated to a mixture of mannitol and sorbitol; and that sucrose may be subjected, in acid solution, to hydrogenating conditions, whereby hydrolysis and reduction occur in the same reactor, again to yield a mixture of sorbitol and mannitol.

Neither of these procedures is adaptable to the production of mixtures of mannitol and sorbitol, which are free from residual sugars and free from polyhydric materials other than mannitol and sorbitol, especially when the hydrogenation is carried out in a continuous manner. When it is attempted to hydrolyze and hydrogenate sucrose in a single step the acidity requisite to insure complete hydrolysis in the short reaction time permitted by an economically feasible continuous process induces partial isomerization of the formed monosaccharides before reduction takes place and upon reduction of these isomers, products other than mannitol and sorbitol are formed. If, conversely, the reaction is carried out in a less acid solution the product is contaminated with unchanged sucrose. On the other hand, if sucrose is first inverted to glucose and fructose, and the mixture subjected to hydrogenation under mild conditions, the resulting product is always found to be contaminated with a non-reducing sugar, which is not sucrose. The extent of such contamination is not numerically large—usually from 0.2% to 1.0%—and it was not recognized in some of the early work, since only the reducing monosaccharides were expected and sought in the products by analysis. For many purposes, however, the presence of these small amounts of non-reducing sugars are very undesirable. They are fermentable which detracts from the storage stability of the solution. They are thermally less stable than sorbitol and cause darkening of the products in high temperature esterification. When sorbitol containing such sugars is employed as plasticizer for flexible glues it exerts a slow tanning action on the gelatin and prevents proper remelting of the glue after storage.

In accordance with the present invention a method is provided for preparing high purity mixtures of sorbitol and mannitol from sucrose, i. e., mixtures containing less than 0.2% non-reducing sugar, and mixtures from which a sorbitol product of pyridine number higher than 90 is obtained by simple crystallization of the mannitol therefrom.

Pyridine number (hereinafter abbreviated PN) as used throughout this specification is an index of the sorbitol content of sorbitol-containing material. This index is determined by crystallizing sorbitol from sorbitol-containing products in the form of a sorbitol-pyridine complex, filtering the crystalline complex, adding water to it to decompose the complex into pyridine and sorbitol, driving off the pyridine by vacuum distillation with water, dehydrating the sorbitol residue and weighing it as sorbitol. The procedure is specific for sorbitol, since no other polyhydric material, such as sugar, mannitol, etc., exhibits the same behavior with pyridine. The PN is the weight of sorbitol crystallized from anhydrous pyridine as above, multiplied by 100 and divided by the weight of the sample (ash, moisture and sugar free). The PN for pure sorbitol is about 95. The preparation of the sorbitol-pyridine complex and its treatment to free sorbitol therefrom is described by Strain in J. Am. Chem. Soc., vol. 56, page 1757 (1934).

The process of the present invention, by which a high purity mixture of sorbitol and mannitol is obtained from sucrose comprises first the partial hydrolysis (or inversion) of sucrose in acid solution, followed by neutralization of the inverted sugar solution to a pH of between 6.0 and 8.0 The neutralized solution is then subjected to continuous hydrogenation, under mild, non-transforming conditions.

The manner in which the sugar is hydrolyzed in the first step is critical to the process. The hydrolysis must be at least 95% complete, as measured by specific rotation of the solution, and must not be over 99% complete. Preferably, the extent of hydrolysis is between 97% and 98% complete, to give a final product of the highest purity. The hydrolysis of sucrose in accordance with this invention must, moreover, be conducted so that it is terminated when the extent of hydrolysis first reaches the selected value in the operating range. It has been discovered that prolonging the hydrolyzing step beyond this stage leads to the production of sugar bodies that are unreduced under hydrogenating conditions and appear in the product as objectionable sugar impurities. The limitation that hydrolysis must be terminated when its extent "first reaches" the selected value is imposed for the reason that on prolonged continuation of hydrolyzing conditions the apparent extent of hydrolysis, as measured by polarimeter, passes through a maximum and then drops somewhat whereby the value may again reach the operating range. However, when this occurs the non-reducible sugar bodies have been formed and the advantages of the invention are not obtained.

The hydrolysis may be accomplished in any suitable manner, preferably by moderate heating in the presence of dilute acid. The sugar concentration may conveniently be a concentration suitable for subsequent catalytic hydrogenation in continuous process, that is from about 25% to 75% by weight, and preferably from about 40% to 60% by weight. The inversion proceeds well when the pH is at any value below about 3.0 Preferably the solution is adjusted to a pH of between 1 and 2. In unbuffered solutions of pure sucrose, containing about 50% dissolved solids, from 0.075% to 0.125% of sulfuric acid based on the sugar content suffices to properly adjust the pH. More strongly acid solutions can be employed, but there is no practical advantage to be gained thereby, and excessive amounts of acid lead to the introduction of objectionably high salt concentrations upon neutralization. The temperature of the inversion may be varied over a considerable range, say from room temperature upwards to 90° C., although preferably temperatures of from 45° to 70° C. are employed. In this range hydrolysis proceeds with practical rapidity; its extent can be readily followed and controlled. The time of hydrolysis is completely dependent upon the acidity and temperature in view of the critical limitation on the extent of hydrolysis hereinbefore described. Samples of the hydrolyzing mixture are removed periodically, the hydrolysis checked by neutralization, and the extent of inversion determined polarimetrically. When this extent first reaches a value between 95% and 99%, preferably between 97% and 98% the inversion of the entire batch is checked by neutralizing to a pH of between 6 and 8 by any suitable means, conveniently by the addition of sodium hydroxide solution.

It is pointed out that in the adjustments of pH hereinbefore mentioned, any suitable acid or alkaline agent may be employed. Thus, the acidity of the sucrose solution may be brought about by the addition of inorganic acids such as sulfuric, hydrochloric or phosphoric acid; by the addition of inorganic acid salts, such as potassium bisulfate; by the addition of organic acids such as acetic, tartaric, or oxalic acid. Similarly, the alkaline material used to check the inversion and adjust the pH to between 6 and 8 may be, instead of sodium hydroxide, potassium or other alkali metal hydroxide, soda ash, lime, an alkaline earth hydroxide, or the like. Preferred agents, for reasons of availability, ease of manipulation and ease of removal from the finished product by ion exchange reaction are sulfuric acid and sodium hydroxide.

The neutralized solution containing sucrose inverted to an extent of 95% to 99% is then subjected to hydrogenation under mild, non-transforming conditions. Preferably, the hydrogenation is conducted in a continuous process, in the presence of an active catalyst and under efficient conditions whereby the time of subjection to elevated temperature and pressure is minimized. It has been found satisfactory to pass, concurrently, a slurry of supported, reduced nickel catalyst in the neutralized, hydrolyzed sugar solution, and hydrogen gas under pressure upward through a vertical reactor or through a plurality of reactors arranged in series, while maintaining the temperature at a predetermined high value. The required proportion of nickel to sugar in the slurry will vary somewhat with the catalytic activity of the nickel but from 0.5% to 5% by weight of nickel on the sugar in solution will usually be found sufficient. Preferably, the nickel content is from 1.5% to 2.5% based on the sugar. It is also preferred to pass a very large excess of hydrogen through the autoclave reactors over that which will react with the sugar, whereby the linear velocity of hydrogen gas through the system is many times that of the linear velocity of the liquid slurry. Depending upon the catalyst activity and concentration and upon the reacting conditions of temperature and pressure, the rate of feed through the continuous system is so correlated with the volume of the individual reactors and the number of reactors in series that the discharged solution contains less than 0.2% reducing sugars and preferably less than 0.1%.

In accordance with the present invention the temperature in the reactor is maintained at from 140° to 170° and the pressure at from 1000 to 2000 pounds per square inch, under which conditions side reactions in the autoclave are minimized and the products of the reduction are substantially pure sorbitol and mannitol. Despite the fact that the feed to the autoclave contains substantial amounts of sucrose which is normally non-reactive to hydrogen, and despite the fact that the partially inverted sugar solution was adjusted to a pH range in which hydrolysis to the reactive hexoses is virtually halted under normal conditions, the product discharged from the reactors is essentially free from non-reducing sugars, i. e., it contains less than 0.2% of invertible sugar and when employing the preferred conditions contains less than 0.15% of such sugar.

The following examples illustrate more specifically the process of the invention.

*Example I*

An aqueous solution containing 47.5% by weight of sucrose was heated to 65° C. The solution was acidified to a pH of 1.8 by the addition of 0.076% (based on the weight of sucrose) of sulfuric acid and held at 65° C. for 5 hours. Sodium hydroxide was added to neutralize the acid and adjust the pH to the range 6–7. The specific rotation of the invert sugar had decreased to −20.1°, from which it can be calculated that the extent of inversion was 97.8%.

A catalyst comprising reduced nickel supported on kieselguhr was added to the neutralized, partially inverted sugar solution in quantity to make the nickel equal 2% of the sugar.

The aqueous sugar-catalyst slurry was hydrogenated by passing it concurrently with hydrogen gas upwardly through a plurality of elongated vertical reactors arranged in series under a pressure of 1600 pounds per square inch and at a temperature of 150° C. The slurry passed through the reactor system in from 45 to 90 minutes and compressed hydrogen was fed into the reactor at a linear rate of about 10 times that of the slurry.

From the end of the reactor system unreacted hydrogen was separated from the slurry and recirculated together with make-up hydrogen to replace that consumed by chemical reaction and by mechanical losses. The slurry was filtered free from catalyst, cooled and demineralized to free it from traces of iron, nickel, and sodium sulfate by passage through beds of cation and anion resin exchangers in sequence. The resulting solution contained only 0.05% reducing sugars and 0.12% non-reducing sugars based on the solid content. Mannitol was separated from the product by crystallization from aqueous alcohol and the sorbitol converted to an aqueous solution of 70% concentration, exhibiting a PN of well above 90.

*Example II*

The process of Example I was repeated with the exception that the time of holding the sucrose at 65° C. during the inversion was 4 hours instead of 5 hours. The extent of inversion thus obtained was 95.8%. The reduced solution from the autoclave contained 0.05% reducing sugars and 0.18% non-reducing sugars. After separation of the mannitol, a sorbitol solution of PN greater than 90 remained.

*Example III*

A sucrose solution was inverted according to the process of Example I with the exception that the hydrolysis at 65° C. was continued for 6 hours instead of 5 hours. The resulting extent of inversion was 98.8%. The hydrolyzed product was hydrogenated according to the process of Example I. The finished product contained 0.05% and 0.19% of reducing and non-reducing sugars, respectively. After crystallization of the mannitol the residual sorbitol solution had a PN of greater than 90.

*Example IV*

Sucrose in 50% aqueous solution was hydrolyzed for 5 hours at 65° C. in the presence of 0.080% sulfuric acid (based on the sugar). The inversion was checked by neutralizing to a pH of 6.0–6.5 with sodium hydroxide. By specific rotation the extent of inversion was found to be 98.6%.

Reduced nickel catalyst supported on kieselguhr was added in quantity sufficient to make the nickel concentration 1.7% on the sugar. The slurry so formed was hydrogenated in the previously described continuous apparatus, at a temperature of 160° C., and under a pressure of 1600 pounds per square inch. The autoclave discharge product contained 0.04% reducing sugars and 0.18% non-reducing sugars (on solids basis) and, after separation of the mannitol, yielded a sorbitol solution of PN greater than 90.

The above examples illustrate that by maintaining the extent of hydrolysis between about 95% and 99% the reduction product, when the reducing sugar content is lowered to less than 0.1% by hydrogenation, contains less than .2% non-reducing sugars. They further show that the content of non-reducing sugar in the reduction product goes through a minimum when the extent of hydrolysis during the inversion step is between 97 and 98%. When the extent of hydrolysis lies outside of the specified range of 95% to 99% the content of non-reducing sugar in the final product becomes objectionably large. Thus sucrose, over-hydrolyzed by holding at 65° C. for 16 hours at a pH of 1.8, yielded a reduction product containing 0.45% non-reducing sugar under conditions comparable to those of Examples I to III. Sucrose, under-hydrolyzed (93.8% inverted) by holding for only 3 hours at 65° C. at the same condition produced a reduction product containing 0.67% non-reducing sugar.

In the above illustrative examples the hydrolysis was effected by adding mineral acid to the sucrose solution and holding at elevated temperature. It is to be understood that any means of inverting sucrose to an extent of 95% to 99% is equally within the purview of the invention, the essential elements of which include the steps of hydrolyzing aqueous sucrose, interrupting the hydrolysis when it is from 95% to 99% complete, adjusting the pH of the partially hydrolyzed solution to a value between 6 and 8, and subjecting the solution to hydrogenation under mild non-transformnig conditions, until the content of reducing sugar is less than 0.1%.

What is claimed is:

1. A process for the production of a sorbitol-mannitol mixture of low sugar content which comprises hydrolyzing the sucrose in an aqueous solution thereof, interrupting the hydrolysis when it is from 95% to 99% complete, adjusting the pH of the said hydrolyzed sucrose solution to a value between 6 and 8, catalytically hydrogenating the said adjusted solution at a temperature of from 140 to 170° C. and under a hydrogen pressure of from 1000 to 2000 pounds per square inch until the reducing sugar content is less than 0.1% based on dissolved solids, and separating the hydrogenation catalyst from the resulting solution.

2. A process as in claim 1 wherein the said aqueous solution of sucrose contains from 25% to 75% by weight of sucrose.

3. A process as in claim 2 wherein the hydrogenation is carried out in continuous process.

4. A process as in claim 3 wherein the said hydrolysis is interrupted when it is from 97% to 98% complete.

5. The process which comprises the steps of hydrolyzing an aqueous solution of sucrose containing from 25% to 75% sucrose by weight, at a pH of less than 3 and in the temperature range of from 45° to 90° C., adjusting the pH of the said solution to a value between 6 and 8 when the hydrolysis has become from 95% to 99% complete, and continuously hydrogenating the solution so neutralized at a temperature of from 140 to 170° C. and under a hydrogen pressure of from 1000 to 2000 pounds per square inch until the reducing sugar content is less than 0.1% based on dissolved solids.

6. The process of claim 5 in which the said aqueous solution of sucrose contains from 40% to 60% sucrose, the said hydrolysis is conducted at a pH of from 1 to 2 and at a temperature of from 45° to 70° C., and the said adjustment of pH to a value between 6 and 8 is effected when the hydrolysis is from 97% to 98% complete.

References Cited in the file of this patent

UNITED STATES PATENTS

| 2,209,055 | Hanford | July 23, 1940 |
| 2,280,975 | Power | Apr. 28, 1942 |
| 2,292,293 | Rose | Aug. 8, 1942 |
| 2,335,731 | Bottoms | Nov. 30, 1943 |
| 2,518,235 | Harstra et al. | Aug. 8, 1950 |

OTHER REFERENCES

U. S. Dept. of Comm. Nat. Bur. Standards: "Polarimetry, Sascharimetry and the Sugars" (1942), Circular C 440, p. 133.